United States Patent
Calvert et al.

(10) Patent No.: US 10,015,020 B2
(45) Date of Patent: *Jul. 3, 2018

(54) INTERLEAVED COMMUNICATION WITH RESOURCE PROVIDERS AND A HOME AREA NETWORK

(71) Applicant: Landis+Gyr Innovations, Inc., Alpharetta, GA (US)

(72) Inventors: Chris Calvert, Alpharetta, GA (US); Stephen Chasko, Marietta, GA (US); James Hartman, Canton, GA (US); Sean Holcombe, Roswell, GA (US); Jeffrey Shudark, Cumming, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,801

(22) Filed: Sep. 7, 2017

(65) Prior Publication Data

US 2017/0366369 A1 Dec. 21, 2017

Related U.S. Application Data

(63) Continuation of application No. 14/830,271, filed on Aug. 19, 2015, now Pat. No. 9,787,491.

(Continued)

(51) Int. Cl.
*H04L 12/28* (2006.01)
*H04J 3/16* (2006.01)
(Continued)

(52) U.S. Cl.
CPC ........ *H04L 12/2818* (2013.01); *H04J 3/1694* (2013.01); *H04L 12/2825* (2013.01);
(Continued)

(58) Field of Classification Search
None
See application file for complete search history.

(56) References Cited

U.S. PATENT DOCUMENTS 6,665,303 B1 12/2003 Saito et al.
7,539,175 B2 5/2009 White et al.
(Continued)

FOREIGN PATENT DOCUMENTS

| CN | 104039020 | 9/2014 |
|----|-----------|--------|
| EP | 2503298 | 9/2012 |
| WO | 2016153557 | 9/2016 |

OTHER PUBLICATIONS

U.S. Appl. No. 15/375,916, "Non-Final Office Action", Mar. 9, 2018, 25 pages.

(Continued)

*Primary Examiner* — Gregory B Sefcheck
(74) *Attorney, Agent, or Firm* — Kilpatrick Townsend & Stockton LLP

(57) ABSTRACT

Systems and methods are disclosed for interleaving communications with a home area network (HAN) and a data network. A gateway device interleaves communications within timeslots of a time slotted channel hopping protocol. A gateway device can be configured to determine, during a first portion of a timeslot, whether the gateway device received a portion of a message from a data network. If the gateway device receives no messages from the data network during the first portion of the timeslot, the gateway device switches to listen for communication from the HAN during a second portion of the timeslot. If the gateway device receives a portion of the message from the HAN, the gateway device continues to receive receives the remainder of the message until one or more trigger conditions that cause the gateway device to listen for communication from the data network.

21 Claims, 10 Drawing Sheets

Related U.S. Application Data

(60) Provisional application No. 62/136,028, filed on Mar. 20, 2015.

(51) Int. Cl.
*H04W 76/15* (2018.01)
*H04W 88/16* (2009.01)

(52) U.S. Cl.
CPC ......... *H04L 12/2836* (2013.01); *H04W 76/15* (2018.02); *H04L 2012/2841* (2013.01); *H04W 88/16* (2013.01)

(56) References Cited

U.S. PATENT DOCUMENTS

| | | | |
|---|---|---|---|
| 7,991,351 B2 | 8/2011 | Kuban | |
| 8,055,802 B2 | 11/2011 | Choi et al. | |
| 8,149,095 B2 | 4/2012 | Hayashi et al. | |
| 8,176,112 B2 | 5/2012 | Hicks et al. | |
| 8,374,212 B2 | 2/2013 | Charbit et al. | |
| 8,554,137 B2 * | 10/2013 | Wyper | H04W 72/1215 455/41.2 |
| 8,606,182 B2 * | 12/2013 | Wyper | H04W 72/1215 455/41.2 |
| 8,942,102 B2 | 1/2015 | Edge et al. | |
| 9,100,108 B2 | 8/2015 | Prajapati et al. | |
| 9,172,510 B2 | 10/2015 | Chakravarthy et al. | |
| 9,295,075 B2 * | 3/2016 | Wyper | H04W 72/1215 |
| 9,467,449 B2 | 10/2016 | Defrance et al. | |
| 9,516,698 B2 | 12/2016 | Schmandt et al. | |
| 9,537,642 B2 | 1/2017 | Belghoul et al. | |
| 9,787,491 B2 | 10/2017 | Calvert et al. | |
| 9,825,748 B2 * | 11/2017 | Liang | H04L 5/0073 |
| 9,853,797 B2 * | 12/2017 | Tabet | H04L 27/0006 |
| 2007/0032219 A1 | 2/2007 | Rudolf et al. | |
| 2008/0040509 A1 | 2/2008 | Werb et al. | |
| 2009/0168717 A1 | 7/2009 | Ali et al. | |
| 2012/0082065 A1 | 4/2012 | Yanagihara et al. | |
| 2012/0163275 A1 | 6/2012 | Kim et al. | |
| 2013/0242836 A1 | 9/2013 | Vaidya et al. | |
| 2013/0243038 A1 | 9/2013 | Rasband et al. | |
| 2013/0272260 A1 | 10/2013 | Bitran et al. | |
| 2013/0279427 A1 | 10/2013 | Wentink et al. | |
| 2014/0044106 A1 | 2/2014 | Bhagwat | |
| 2015/0223115 A1 * | 8/2015 | Liang | H04W 28/085 370/235 |
| 2016/0198344 A1 | 7/2016 | Oba et al. | |
| 2016/0277206 A1 | 9/2016 | Calvert et al. | |
| 2016/0278079 A1 | 9/2016 | Xhafa et al. | |
| 2016/0295400 A1 | 10/2016 | Jeong et al. | |
| 2016/0302179 A1 | 10/2016 | Gupta et al. | |
| 2016/0353378 A1 | 12/2016 | Kim et al. | |
| 2016/0360470 A1 | 12/2016 | Roberts et al. | |
| 2017/0027003 A1 | 1/2017 | Kojima et al. | |
| 2017/0055278 A1 | 2/2017 | Jechoux et al. | |
| 2017/0227961 A1 | 8/2017 | Baroudi et al. | |
| 2017/0310358 A1 | 10/2017 | Vijayasankar et al. | |
| 2017/0311360 A1 | 10/2017 | Singh et al. | |
| 2017/0324443 A1 * | 11/2017 | Turner | H04B 1/7156 |
| 2018/0054250 A1 | 2/2018 | Zhang et al. | |

OTHER PUBLICATIONS

International Patent Application No. PCT/US2017/063631, "International Search Report and Written Opinion", Mar. 1, 2018, 15 pages.
U.S. Appl. No. 14/830,271, Non-Final Office Action dated on Apr. 24, 2017, 17 pages.
U.S. Appl. No. 14/830,271, Notice of Allowance dated on Jul. 31, 2017, 8 pages.
U.S. Appl. No. 15/375,916, filed Dec. 12, 2016.
International Application No. PCT/US2015/057325, International Preliminary Report on Patentability dated on Oct. 5, 2017, 8 pages.
International Application No. PCT/US2015/057325, International Search Report and Written Opinion dated on Jan. 13, 2016, 13 pages.
Rhee et al., OSIA Standards & Technology Review Journal, Retrieved from the internet: http://www.osia.or.kr, vol. 23, No. 3, Sep. 2010, pp. 1-58.

* cited by examiner

INTERLEAVED COMMUNICATION WITH RESOURCE PROVIDERS AND A HOME AREA NETWORK

CROSS-REFERENCE TO PRIORITY APPLICATIONS

This application claims priority to U.S. patent application Ser. No. 14/830,271 filed on Aug. 19, 2015, now U.S, Pat. No. 9,787,491 issued Oct. 10, 2017, which claims priority to U.S. Provisional Application 62/136,028, filed on Mar. 20, 2015, each of which is incorporated herein by reference in its entirety.

TECHNICAL FIELD

This disclosure relates generally to networking and more particularly relates to interleaved communication with a data network and a home area network.

BACKGROUND

A home area network may be used to communicate information between devices that consume resources (e.g., electricity) in a home or other premises and devices that monitor and/or manage the consumption of resources. Utility companies and other resource providers may use home area networks to monitor consumption of the resources by consumers.

A home area network may operate on a separate network from a data network used by the resource provider. A device that provides communication between a home area network and the data network typically requires multiple radio transceivers that process separate messages from the separate networks to send and receive information from both the home area network and the data network. Accordingly, systems and methods are desirable for interleaving communication with the home area networks and communication with the data network while using a single radio transceiver.

SUMMARY

Systems and methods are disclosed for interleaving communications with a home area network (HAN) and communications with a data network. The data network can provide communications between the HAN and resource providers that manage the consumption of the HAN resources. An example system includes multiple client devices communicatively coupled to the HAN and a gateway device communicatively coupled to the client devices or to a HAN controller. The HAN is configured for communicating information regarding a resource consumed at a geographical area serviced by the home area network. The gateway device is also communicatively coupled to a resource provider server system via the data network. The data network can be an advanced metering infrastructure mesh network, including devices that communicate using a time slotted channel hopping (TSCH) protocol. In some aspects, the gateway device is a node that is part of the data network. The data network can be considered a primary network and the TSCH protocol can be considered a primary protocol. The HAN can be considered a secondary network. Devices within the HAN can communicate using a secondary protocol, which can include any carrier sense multiple access protocol.

The gateway device is configured to receive interleaved communications of the data network and the HAN by switching receive periods between the data network and the HAN within a single TSCH timeslot. The communications are interleaved among a sequence of TSCH timeslots. During an RX wait period of a TSCH timeslot, the gateway device listens for communication from the data network and determines if it received, from the data network a portion of a message that requires processing by the gateway device. If the gateway device did not receive, from the data network, a portion of a message that requires processing by the gateway device during the RX wait period, then, during a second portion of the TSCH timeslot, the gateway device listens for communication from the HAN secondary network. The gateway device determines if it received, from the HAN secondary network, a portion of a message that requires processing by the gateway device. If the gateway device determines that it received, from the HAN secondary network, a portion of a message that requires processing by the gateway device, then the gateway device continues to receive the remaining message from the HAN. Messages from the HAN can vary in length and can span one or more TSCH timeslots. Certain trigger conditions can cause the gateway device to revert to listening for communication from the data network. In response to one or more trigger conditions, the gateway device can again determine if it received a message from the data network.

An example of one trigger condition is the beginning of a new TSCH timeslot. For example, the gateway device may receive a complete message from the HAN, the receipt of the message completing during a portion of a TSCH timeslot. The start of the RX period of the subsequent timeslot can act as a trigger condition, causing the gateway device to listen for communication from the data network. Another example of a trigger condition is the start of a guaranteed timeslot. For example, the gateway device may be in the process of receiving a message from the HAN during the start of a guaranteed timeslot. The start of the guaranteed timeslot can act as a trigger condition, causing the gateway device to interrupt receipt of the message from the HAN to start listening for communication from the data network.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where:

FIG. 5 is a diagram illustrating an example of one of the timeslots shown in

FIG. 4;

DETAILED DESCRIPTION

Figure 1:
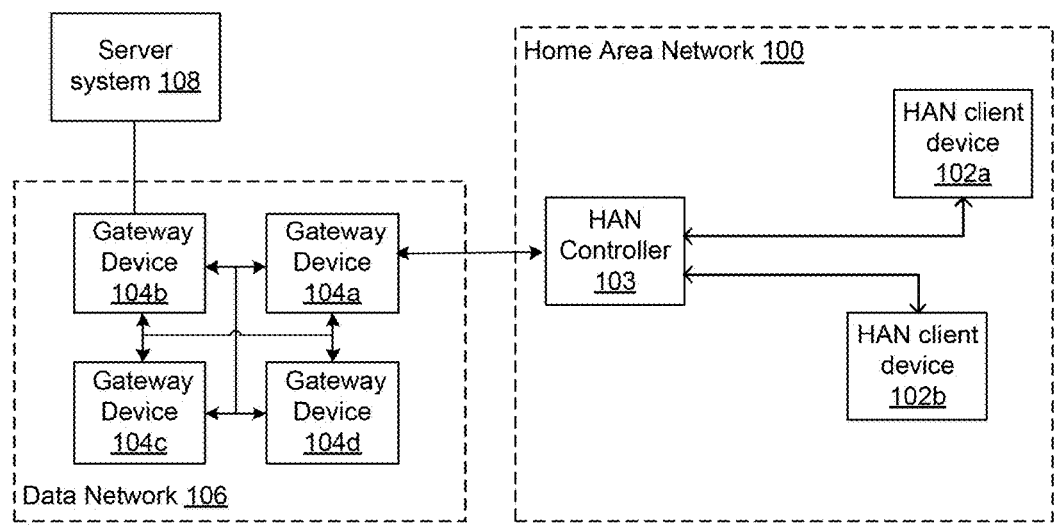
FIG. 1 is a network diagram illustrating example computing devices for implementing interleaved media access control features.

Systems and methods are provided for interleaved communication between a data network and a home area network (HAN). The data network can provide communication between the HAN and resource providers that monitor consumption of resources within the HAN, as well as between other devices on the data network. Interleaved communication can be achieved by a dual media access control (MAC) gateway device with a single radio transceiver. The gateway device can communicate with both the data network and the HAN. The data network can be referred to as a primary network and the HAN can be referred to as a secondary network. According to aspects herein, nodes in the data network can communicate using a time synchronized channel hopping (TSCH) protocol, defined by IEEE 802.15.4(e). The TSCH protocol uses a series of timeslots and multiple channel frequencies for communication between devices, including the gateway device, on the data network. In the TSCH protocol, there may be instances when there is unused time within a timeslot. For example, if a node in the data network listening for communication does not receive a communication within a predefined period of time, the node may determine that no communication will be received during that timeslot, leaving the expiration of the predefined period of time and the beginning of the next timeslot unused. Communication with both the HAN network and the data network can occur by switching receive periods in a sequence of TSCH timeslots, listening for communication from the HAN during unused portions of TSCH timeslots. Communication from the data network can include the receipt of one or more messages from the data network that the node is required to process. Similarly, communication from the HAN can include the receipt of one or more messages from the HAN that the node is required to process. Interleaving communication with the HAN during unused periods of TSCH timeslots can allow communication with the HAN network and the data network using a single radio transceiver.

In an exemplary system, a gateway device is provided for coupling a HAN to a data network. For example, a HAN can communicatively link multiple devices associated with a power distribution system in a dwelling, a structure, or other suitable geographical area. As used herein, the term "power distribution system" is used to refer to a group of devices, systems, and/or other suitable infrastructure for transferring power from a power provider, to one or more end users or geographical locations, such as a dwelling, structure, or other geographical area. A HAN can include a smaller number of network devices (e.g., personal computers, mobile computing devices, etc.) than larger data networks such as a local area network or a wide area network. In some aspects, a HAN can include low-power network devices that can wirelessly communicate with other devices in the HAN. A HAN can be implemented using any suitable networking protocol. For example, a HAN can be implemented using any carrier sense multiple access (CSMA) networking protocol. Non-limiting examples of suitable networking protocols for implementing a HAN include ZigBee, Bluetooth, Wi-Fi, and the like. Non-limiting examples of a HAN include a HomePlug network implemented via power line communications, a Multimedia over Coax Alliance ("MoCA") network providing network connectivity between appliances and networking devices implemented via coaxial cable, a HomePNA Alliance network, etc. In some aspects, a HAN can be implemented using a TSCH networking protocol. The network used within the HAN can be referred to as the secondary network.

The gateway device can be installed in or near the dwellings or structures serviced by the HAN and can communicate with the HAN using the HAN networking protocol. The gateway device can also communicate with a data network that may be operating a TSCH networking protocol. The gateway device may include a single wireless transceiver device that implements dual MAC interfaces. One of the MAC interfaces is configured for communicating with the HAN and the other MAC interface is configured for communicating with the data network. A processor within the gateway device can receive communication data from the HAN during the unused timeslots of the data network. For example, at the beginning of a TSCH timeslot, the gateway device may listen for communication from the data network. If the gateway device does not detect an incoming message during a first portion of a TSCH timeslot, the gateway device may listen for messages from the HAN during a second portion of the TSCH timeslot.

As used herein, the term "head-end system" is used to refer to a device or group of devices used to provide one or more management functions for a data network or other system including multiple interconnected devices. For example, a head-end system for a power distribution system using intelligent metering may provide communication and/or data collection layers between the smart meter infrastructure of the power distribution system and one or more higher-level data processing systems of the power distribution system.

The gateway device thus provides for communication between the HAN and the data network. In some aspects, the gateway device can be a node that is part of the data network. Metering devices can report, to the server system, amounts of power consumed by client devices within the HAN via the data network. By switching listen periods for communications with the data network and communications with the home area network during a sequence of TSCH timeslots, the gateway device can effectively communicate between two separate networks using a single radio transceiver.

These illustrative examples are given to introduce the reader to the general subject matter discussed here and are not intended to limit the scope of the disclosed concepts. The following sections describe various additional aspects and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating an example HAN 100 that can be communicatively coupled to a data network 106 via a gateway device 104a. The HAN 100 can include HAN client devices 102a, 102b and a HAN controller 103. Along with gateway device 104a, the data network 106 can include multiple nodes in a mesh network, shown as gateway devices 104b-d. Each of the gateway devices 104b-d may be coupled to respective HANs (not shown).

The HAN client devices 102a, 102b can include devices used to perform one or more applications related to managing, monitoring, or performing functions that consume power from a power distribution system associated with the HAN 100. Non-limiting examples of such client devices 102a, 102b include a programmable thermostat for managing power consumption, an in-home display device for displaying information related to power consumption and associated billing information for the power consumption, and the like. In additional aspects, one or more of the HAN client devices 102a, 102b may be a device that consumes power to perform one or more mechanical functions or other functions in addition to analyzing, monitoring, displaying, or otherwise using data communicated via the HAN 100. Non-liming examples of such devices include devices that consume power to perform one or more mechanical functions in a dwelling or other structure serviced by the HAN 100, such as (but not limited to) a water heater, a pool pump, an air conditioner, etc. HAN client devices 102a, 102b and HAN controller 103 can wirelessly communicate with each other and with the gateway device 104a. As mentioned above, communication within the HAN 100 and with the gateway device 104a can occur via any suitable CSMA networking protocol.

HAN client devices 102a, 102b can be communicatively coupled to a HAN controller 103. The HAN controller 103 can include any suitable computing device configured to communicate data between the HAN 100 and the gateway device 104a separate from the HAN 100. The HAN controller 103 can include an application processor that can access or include a memory device that stores program code executable by the application processor. The application processor of the HAN controller 103 can communicate power consumption information between HAN client devices 102a, 102b and the gateway device 104. Multiple HAN controllers 103 can monitor respective structures that are units of a multi-dwelling unit and that include respective HANs 100. While HAN 100 with HAN controller 103 communicatively coupled to HAN client devices 102a, 102b is shown for illustrative purposes, other aspects are also possible. For example, while HAN controller 103 is shown as included in the HAN 100 for illustrative purposes, the HAN controller 103 can also be separate from the HAN 100 in alternative aspects. Further, alternative aspects may include a HAN 100 without the use of a HAN controller 103. In this aspect, HAN client devices 102a, 102b communicate directly with the gateway device 104a without the use of a HAN controller 103. HAN client devices 102a, 102b can include metering devices for monitoring power consumption information and communicate the respective power consumption information directly to the gateway device 104. In some aspects, gateway devices 104a-d can include metering information that monitor, collect, or otherwise manage power consumption information of HAN 100 and HAN client devices 102a, 102b.

The gateway device 104a can communicate the information from the HAN controller 103 to a server system 108 via a data network 106, which may be implemented as an Advanced Metering Infrastructure (AMI) mesh network using a TSCH protocol. A non-limiting example of a server system 108 is a head-end system for a power distribution network that provides power to a dwelling, structure, or other geographical area serviced by the HAN 100. The gateway device 104a provides communication between the rest of the data network 106 and the HAN 100. The data network 106 can provide a communication channel between the gateway device 104 and the server system 108. A communication channel can include any suitable means capable of communicating signals between the HAN gateway device 104a and the server system 108. Examples of suitable communication media include (but are not limited to) Ethernet cable, wireless data communication, power cables for use in power line communication ("PLC"), etc. Power line communication can include communicating signals via cables used for providing electric power from a utility company to buildings in a geographic area. The data network 106 can be configured using any suitable network topology, such as (but not limited to) a mesh network (as mentioned above), a ring network, a star network, a bus network, etc. The data network 106 can include other nodes, shown as gateway devices 104b-d.

Figure 2:
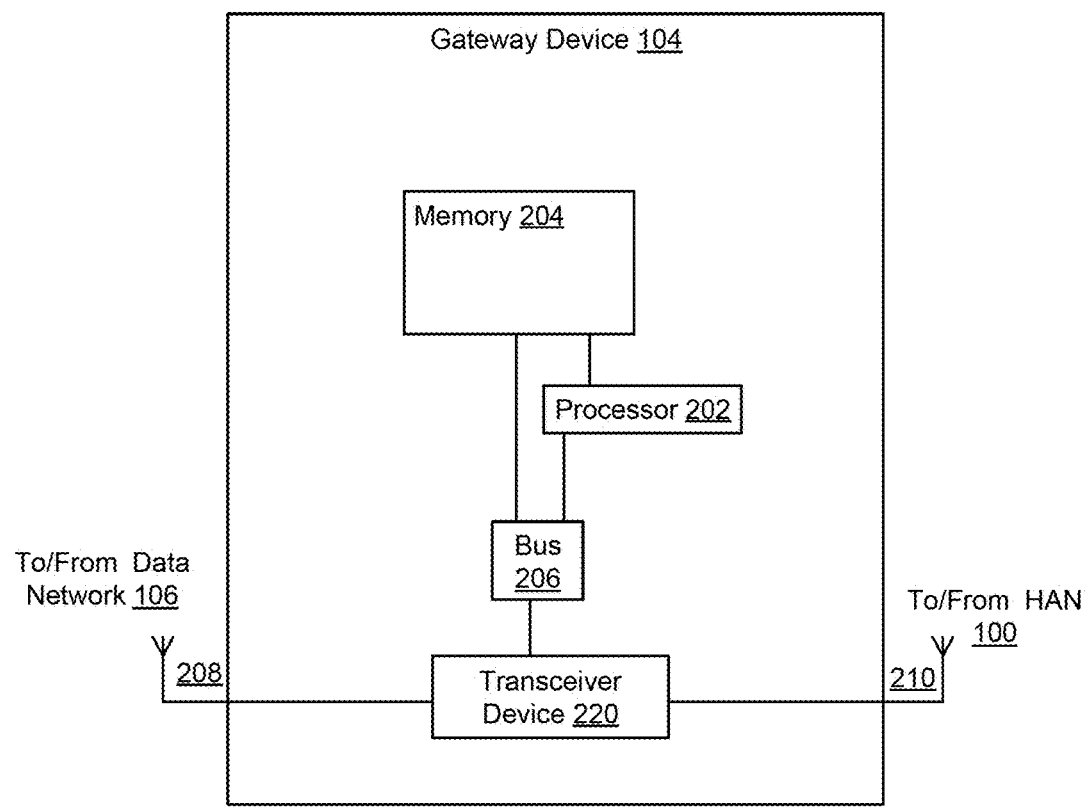
FIG. 2 is a diagram illustrating an example of a gateway device configured to implement interleaved media access control features.

In aspects disclosed herein, the gateway device 104a can communicate with both the HAN 100 and the rest of the data network 106 via a single radio transceiver that implements more than one MAC interface. FIG. 2 is a block diagram illustrating an example of a gateway device 104a with a single transceiver device 220 implementing two MAC interfaces via network interfaces 208, 210.

The gateway device 104aa can include a processor 202. Non-limiting examples of the processor 202 includes a microprocessor, an application-specific integrated circuit (ASIC), a state machine, a field programmable gate array (FPGA) or other suitable processing device. The processor 202 can include any number of processing devices, including one. The processor 202 can be communicatively coupled to non-transitory computer-readable media, such as memory device 204. The processor 202 can execute computer-executable program instructions and/or access information stored in the memory device 204.

The memory device 204 can store instructions that, when executed by the processor 202, causes the processor 202 to perform operations described herein. The memory device 204 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language.

Non-limiting examples of suitable computer-programming languages include C, C++, C#, Visual Basic, Java, Python, Perl, JavaScript, ActionScript, and the like.

The gateway device 104a can also include a bus 206. The bus 206 can communicatively couple one or more components of the gateway device 104a. Although the processor 202, the memory device 204, and the bus 206 are respectively depicted in FIG. 2 as separate components in communication with one another, other implementations are possible. For example, the processor 202 the memory device 204, and the bus 206 can be respective components of respective printed circuit boards or other suitable devices that can be disposed in gateway device 104a to store and execute programming code.

The gateway device 104a can also include a transceiver device 220 communicatively coupled to the processor 202 and the memory device 204 via the bus 206. Non-limiting examples of a transceiver device 220 include an RF transceiver and other transceivers for wirelessly transmitting and receiving signals. The HAN client devices 102a, 102b can also include transceiver devices for communication with the HAN controller 103 or the gateway device 104a. The transceiver device 220 is capable of implementing at least two MAC interfaces to communicate with the data network 106 and the HAN 100 via antennas 208, 210, respectively. While multiple antennas 208, 210 are shown for illustrative purposes, other aspects include a transceiver device 220 that can communicate with the data network 106 and the HAN 100 with a single antenna. The gateway device 104a can communicate with the data network 106 and the HAN 100 using a single transceiver device 220 via the same or differing network protocols. For example, the gateway device 104a can communicate with a HAN 100 configured to use a CSMA protocol (e.g., ZigBee IEEE 802.15.4) via antenna 210 while the gateway device 104a can communicate with the data network 106 using the TSCH protocol (e.g., network protocol governed by IEEE 802.15.4e) via antenna 208. In some aspects, the gateway device 104a may communicate with both the data network 106 and the HAN 100 even if the data network 106 and the HAN 100 use different frequencies. For example, gateway device 104a may be configured to send and receive signals with the rest of the data network 106 at 920 Mhz while the gateway device 104a may be configured to send and receive signals with the HAN 100 at a frequency of 900 Mhz.

Figure 3:
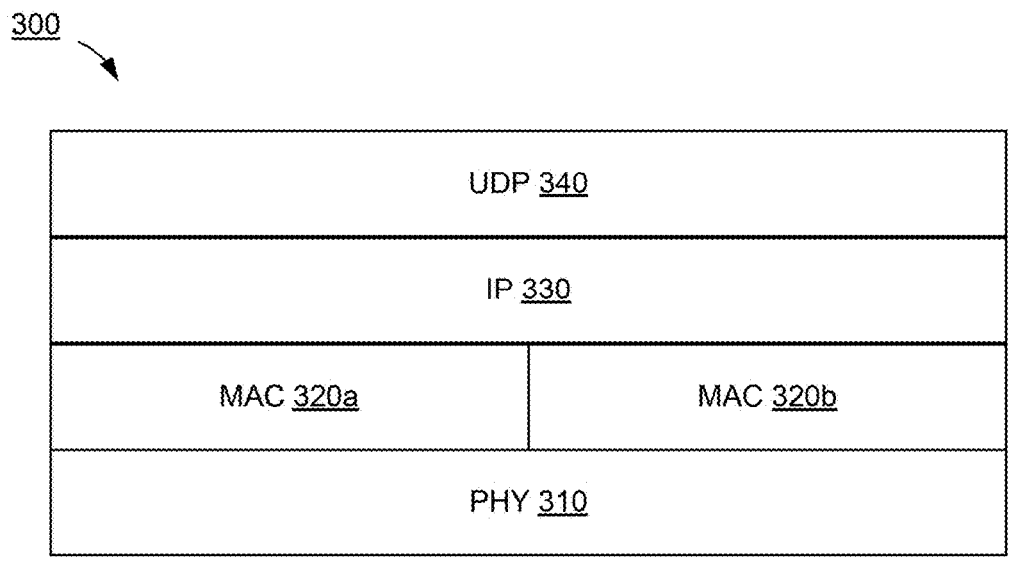
FIG. 3 is a diagram of an example protocol stack for a single radio transceiver device that implements multiple media access control protocols.

As discussed above, the gateway device 104a is capable of implementing two MAC protocols using a single transceiver device 220 (e.g., a single radio). FIG. 3 depicts an example protocol stack 300 for a single radio transceiver device 220 that can implement two different MAC protocols. The protocol stack 300 includes, at the bottom layer, the physical interface (PHY) 310. The PHY 310 can define the specifications of the physical transmission medium, such as the transceiver device 220. The next layer of the protocol stack 300 for the gateway device 104a includes at least two MAC layers 320a, 320b. MAC layer 320a, for example, defines the addressing and channel access protocols for a TSCH network, allowing the transceiver device 220 to communicate with the data network 106. Similarly, MAC layer 320b can define the addressing and channel access protocols for a CSMA network, allowing the transceiver device 220 to communicate with the HAN 100. The traffic for both MAC layer 320a and MAC layer 320 can be routed through a single IP layer 330. For example, data from both a data network 106 and a HAN 100 can be included on TSCH timeslots used by the data network 106. The data for the data network 106 and CSMI data for the HAN 100 can be communicated via transport layer such as UDP 340.

As mentioned above, the data network 106 may be an AMI mesh network, which may follow a TSCH communication protocol to communicate wireless information within the network and outside the network. In the TSCH protocol, devices within the network are synchronized on a current TSCH timeslot. To communicate with the HAN 100 and the data network 106 using a single transceiver 220, the gateway device 104a can switch listening periods between the data network 106 and the HAN 100 during TSCH timeslots, resulting in interleaved communication with the data network 106 and the HAN 100. Thus, the gateway device 104a can support both the data network 106 (operating a TSCH protocol) and the HAN 100 (which may or may not operate using the TSCH protocol) via a single transceiver device 220.

Figure 4:
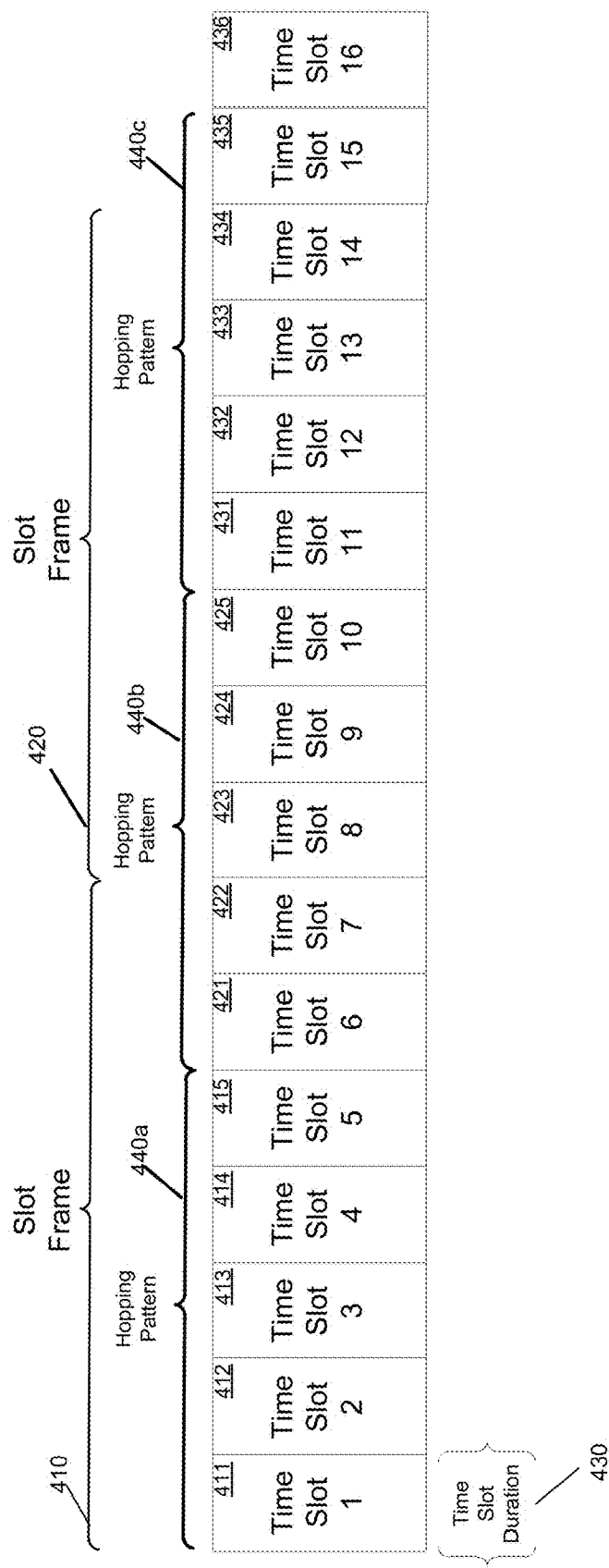
FIG. 4 is a is a diagram illustrating the arrangements of timeslots in a time slotted channel hopping pattern.

Each timeslot in the TSCH protocol is of a time duration of duration "T" which can be defined in milliseconds or other appropriate time unit. The TSCH protocol also uses a multiple channel frequencies for communication between devices in the network. A hopping pattern defines the channel used to communicate during each timeslot. FIG. 4 is a diagram illustrating timeslots and channel hopping pattern for the TSCH protocol. FIG. 4 illustrates timeslots 411-415, 421-425, and 431-436, each with the same timeslot duration 430. Each slot frame 410 and 420 includes seven timeslots. FIG. 4 also illustrates the hopping pattern 440 (shown as hopping patterns 440a-c). A hopping pattern defines a channel frequency or channel for each timeslot in the hopping pattern. For example, the hopping pattern 440a may be channel 4, channel 6, channel 3, channel 5, channel 7, i.e., it may associate channel 4 with timeslot 1, channel 6 with timeslot 2, channel 3 with timeslot 3, channel 5 with timeslot 4, and channel 7 with timeslot 5. In FIG. 4 the hopping pattern 440a has a hopping pattern length of 5. The hopping pattern repeats. The first illustrated iteration of the hopping pattern 440a contains timeslots 1-5 (411-415), the second iteration of the hopping pattern 440b contains timeslots 6-10 (416-420), and the third iteration of the hopping pattern 440c contains timeslots 11-15 (421-425). The number of timeslots in a hopping pattern is independent of the number of timeslots in a slot frame.

Figure 5:
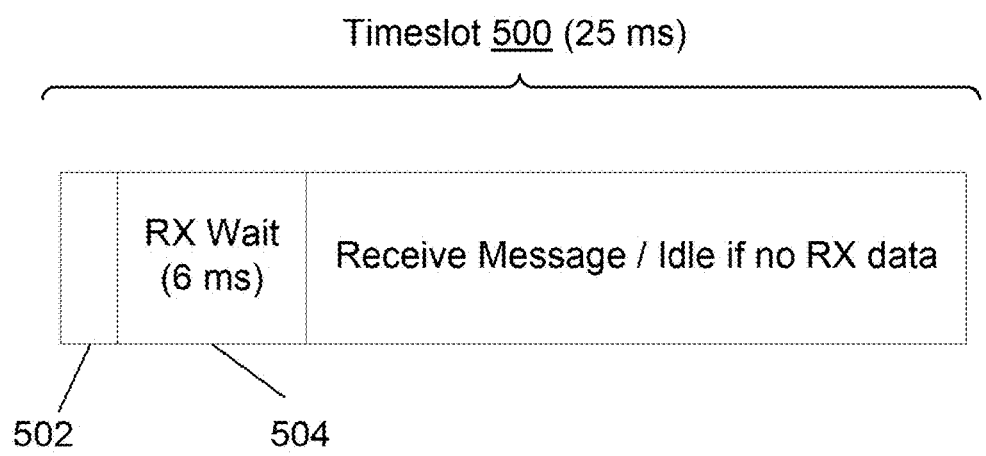

FIG. 5 illustrates a typical TSCH timeslot structure for timeslot 500. In this example, the time periods shown are exemplary and other values may be used in other implementations (e.g., timeslot 500 is shown with a duration of 25 milliseconds, but other periods of a timeslot are also possible). In a TSCH timeslot structure, a node in the data network 106 listens on a channel determined by the TSCH hopping pattern during a first portion of the timeslot for the node's primary network. As shown in FIG. 5, after an RF settle period 502, the node can listen for receive signals on a channel for a first period of time (shown as RX wait time 504). Typically, the duration of the RX wait time 504 is dependent on an expected transmit time duration. The transmit time duration is defined by the IEEE 802.15.4-e TSCH specification. If the node receives a message prior to the expiration of the RX wait time 504, then the node can proceed to receive the rest of the message and process the received message. However, if the node does not receive a message prior to the expiration of the RX wait time 504, then the node may determine that it will not receive a communication from another node on the primary network during the present timeslot. In a typical timeslot structure the remainder of the timeslot 500 may be idle/unused.

Figure 6:
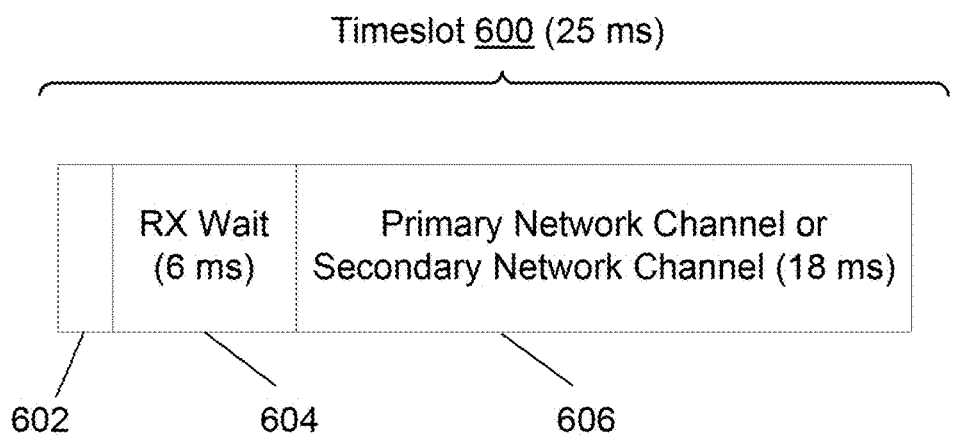
FIG. 6 is a is a diagram illustrating an example of a timeslot in a time slotted channel hopping network that is capable of interleaved media access control features.
Figure 7:
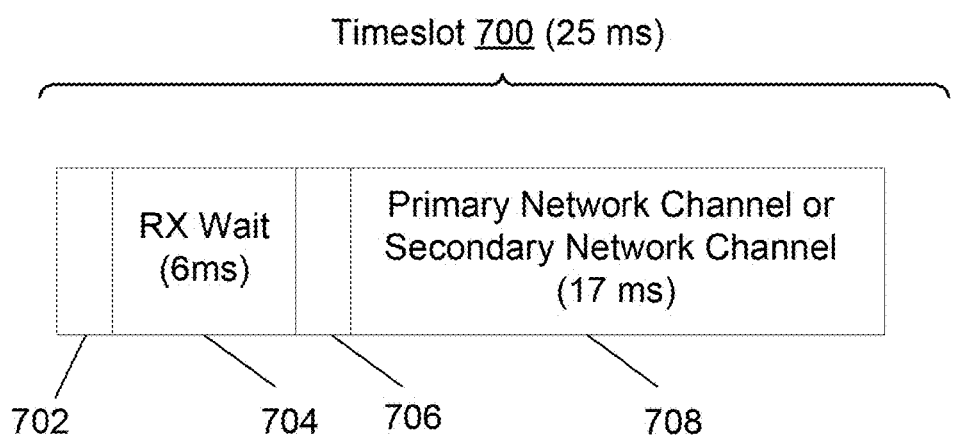
FIG. 7 is an alternate diagram illustrating an example of a timeslot in a time slotted channel hopping network that is capable of interleaved media access control features.

In certain aspects, the gateway device 104a can interleave data from two or more network protocols by receiving the data from a secondary network (e.g., the HAN 100) during the unused time periods of a TSCH timeslot used with the primary network. FIGS. 6 and 7 illustrate two aspects of a TSCH timeslot where a gateway device receives information from a secondary network in the unused portions of the timeslot. FIG. 6 shows a timeslot 600 with an RF settle period 602 and an RX wait period 604, and a receive period 606. Similar to the timeslot 500 shown in FIG. 5, during the RX wait period 604, the gateway device 104a can listen for communication on a channel determined by the hopping pattern for the node's primary network (e.g., the data network 106). If the gateway device receives the beginning of a message from a node on the primary network during the RX wait period 604, the gateway device 104a can continue to receive the primary network message during the receive period 606 (e.g., for the duration of the timeslot 600). If the gateway device 104a does not receive a message from the data network 106 prior to the expiration of the RX wait period 604, then the gateway device 104a may begin to listen for a communication from a node in the secondary network (e.g., the HAN 100) using the same channel or may move to a different channel. If communication from the secondary network is received, the gateway device 104a can receive the message from the secondary network during the receive period 606 (e.g., for the remaining duration of the timeslot 600).

FIG. 7 depicts a similar, but alternate aspect for a TSCH timeslot 700 where a gateway device receives information from a secondary network during the unused periods of the timeslot 700. Timeslot 700 can include a first RX settle period 702, and RX wait period 704, a second RF settle period 706, and a receive period 708. The timeslot shown in FIG. 7 can function similar to the timeslot shown in FIG. 6—allowing the gateway device 104a to receive communications from the primary network if the gateway device 104a detected a message during the RX wait period 704 or to receive communications from the secondary network if the gateway device 104a did not detect a message during the RX wait period 704. The second RF settle period 706 can provide better accuracy in message detection by providing a buffer between the RX wait period 704 and receive period 708. For example, the second RF settle period 706 may provide better accuracy if the HAN 100 and the data network 106 operate on different frequencies.

While FIGS. 6 and 7 are discussed above with reference to the data network 106, gateway device 104a, and HAN 100, the dual MAC timeslot structure shown in FIGS. 6 and 7 can be used in any node in a TSCH network configured to also carry data from a secondary network. For example, any node in a data network 106 can incorporate a dual MAC transceiver device 220 as shown in FIG. 2, allowing the node to include data from a secondary network in unused time periods in timeslots of a primary network.

Figure 8:
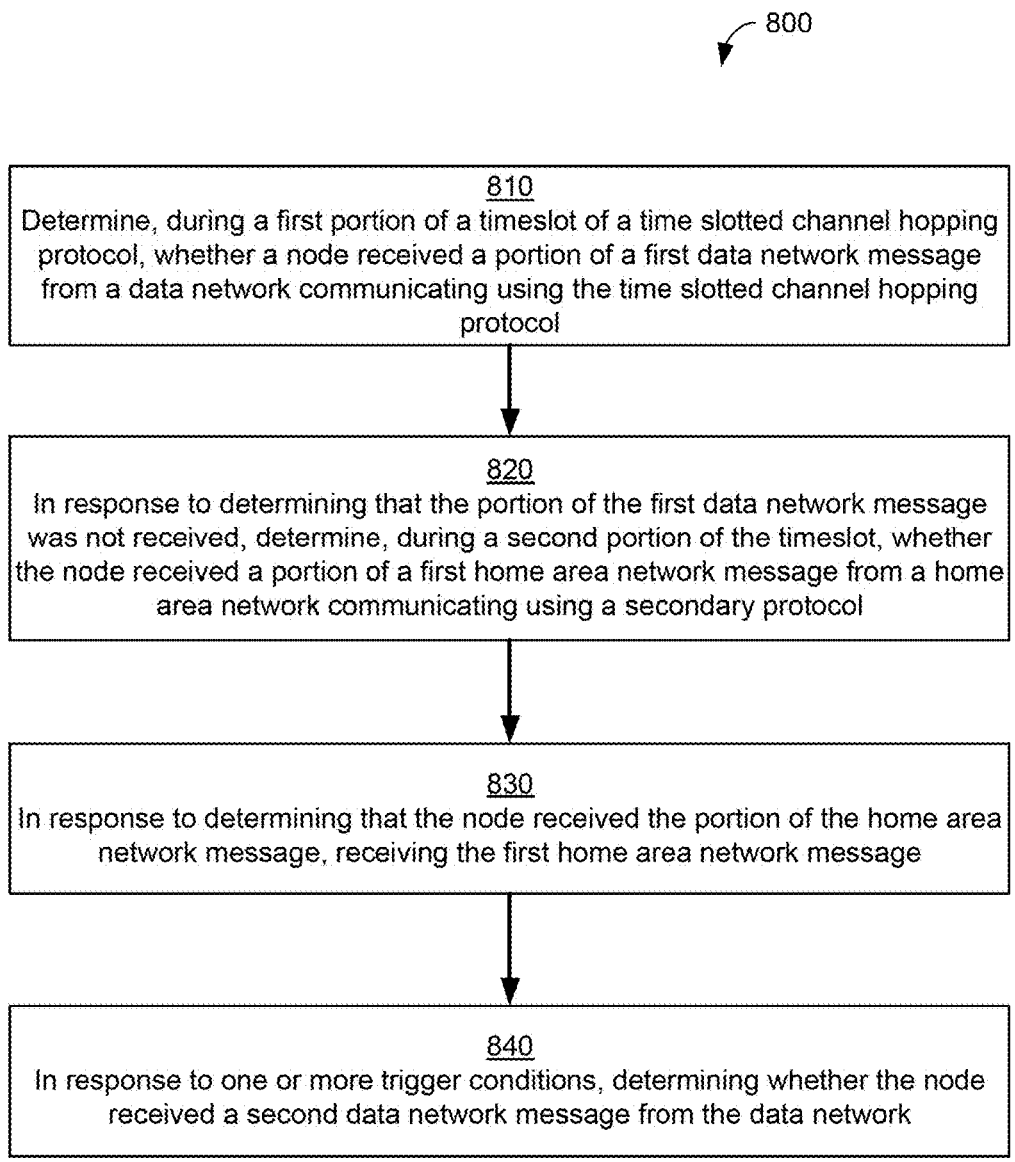
FIG. 8 is a flowchart depicting a process for implementing interleaved media access control features.

FIG. 8 is a flowchart illustrating an example method 800 for communicating data from a HAN 100 within unused portions of TSCH timeslots used for communication with a data network 106. For illustrative purposes, the method 800 is described with reference to the system implementations depicted in FIGS. 1-2 and with regards to the TSCH timeslot illustrations shown in FIGS. 6-7. Other implementations, however, are possible.

The method 800 involves determining, during a first portion of a timeslot of a TSCH protocol, whether a node received a portion of a first data network message that requires processing by the node from a data network communicating using the TSCH protocol, as shown in block 810. In some aspects, the node can include the gateway device 104a, and the processor 202 can execute instructions in the memory device 204 to analyze data being received from the data network 106. The data network 106 can include an AMI mesh network (e.g., gateway devices 104a-d) that routes communication between the server system 108 and the gateway device 104a. The first portion of the timeslot includes the RX wait periods 604, 704 in timeslots 600, 700, respectively. In some aspects, the processor 202 can determine whether a message from the data network 106 that requires processing by the gateway device 104a was received by analyzing the packet header information carried by wireless signals received at the antenna 208. For example, the processor 202 can analyze header information in the UDP layer 340 to determine if received signals are broadcast from the data network 106 or addressed to the gateway device 104a. In some aspects, the node may not receive messages that it needs to process during the first portion of the timeslot. In response to determining that the portion of the data network message was not received, the node may determine, during a second portion of the timeslot, whether the node received a portion of a first home area network message that requires processing by the node from a home area network communicating using a secondary protocol, as shown in block 820. For example, in response to not receiving any messages from the data network 106, the processor 202 in the gateway device 104a may switch from listening for communications on a first MAC protocol to listening for communication from a second MAC protocol. The processor 202 can execute instructions in the memory device 204 to instruct the transceiver device 220 to listen for communication from the HAN 100 and to analyze data being received from the HAN 100 during the receive periods 606, 708 in timeslots 600, 700, respectively. The HAN 100 can be configured for communicating information regarding resources (e.g., resources in a power distribution system) consumed at a geographical area serviced by the HAN 100.

The secondary network protocol (e.g., the protocol being used for communication within the HAN 100) may be the same as or different from the TSCH network protocol being used by the data network 106. For example, the secondary network protocol may include another TSCH protocol. The secondary network protocol can also include a CSMA protocol, such as 802.15.4 Zigbee. Other protocols are also possible. Additionally, the secondary network protocol, and correspondingly the HAN 100, can operate using the same or different frequencies than the data network 106. In one example, the data network 106 operates on a 920 MHz frequency band while the HAN 100 operates on a 900 Mhz band.

In some aspects, the gateway device 104a can maintain synchronization of the clocks of the two different network protocols, even if the network protocols operate on differing frequencies. For example, the processor 202 can calculate the accuracy of a clock signal received from the data network 106 and the accuracy of a second clock signal received from the HAN 100 and compare the timing of the two clock signals. If the timing of the two clock signals indicates that the clocks are drifting, the processor 202 can configure the transceiver device 220 to compensate for the un-synchronized clocks.

In some aspects, the node may determine that the node received a portion of a HAN message on the protocol used by the HAN. For example, the node may determine, by analyzing packet header information in incoming signals, that the received packet originated from the HAN 100. In response to determining that the node received the portion of the HAN message, the node can proceed to receive the remainder of the HAN message, as shown in block 830. For example, the gateway device 104a, upon determining that the node received a portion of a message from the HAN 100, can continue to receive and process the message during the receive periods 606, 708 in timeslots 600, 700 respectively.

The node can continue receiving a message from the secondary network (e.g., from the network used by the HAN 100) until the message is complete or one or more trigger conditions occur. In response to one or more trigger conditions, the node can then switch back to listening for communication from the data network to determine whether the node received a data network message, as shown in block 840. For example, in response to a trigger condition, the processor 202 can instruct the transceiver device 220 to listen for communication from the data network 106.

Trigger conditions can include any condition that causes the gateway device 104a to switch MAC protocols and listen for communication from the data network 106. For example, the trigger condition can include the beginning of a new timeslot or the start of an RX period of a new timeslot. The gateway device 104a can completely receive the message from the HAN 100 during the portion of a TSCH timeslot or at the conclusion of a TSCH timeslot. As timeslots 600, 700 follow a repeating pattern in a TSCH network, the beginning of a subsequent timeslot will contain RX receive periods 604/704, during which the gateway device 104a can return to listening for communication from the data network 106.

Another trigger condition can include the start of a guaranteed timeslot. Communication from the primary network used by the data network 106 can take priority over communication from the secondary network used by the HAN 100. Priority communications within the data network 106 can be provided during guaranteed timeslots. A guaranteed timeslot may be a predefined TSCH timeslot during which nodes of the data network 106 can communicate control and maintenance information. A guaranteed timeslot may be defined as a particular timeslot within a slot frame, a timeslot, or any other defined series of timeslots. At the start of a guaranteed timeslot, the gateway device 104a may interrupt the ongoing transmission of the message from the HAN 100, allowing the gateway device 104a to listen for communication from the data network 106 during the guaranteed timeslot. For example, the gateway device 104a can listen for a beacon transmitted by a node in the data network 106. A beacon can include a message that is transmitted throughout the nodes of the data network 106 (e.g., throughout gateway devices 104a-d) that the nodes use for synchronization.

Figure 9:
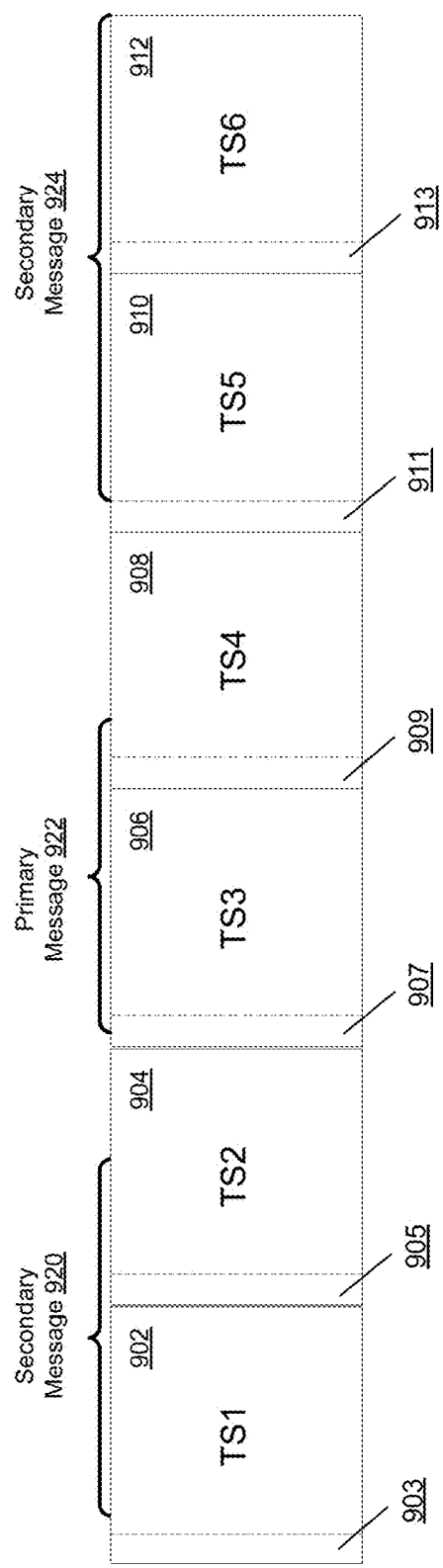
FIG. 9 is a diagram illustrating an example of a sequence of timeslots and interleaved media access control features being implemented in the timeslots.
Figure 10:
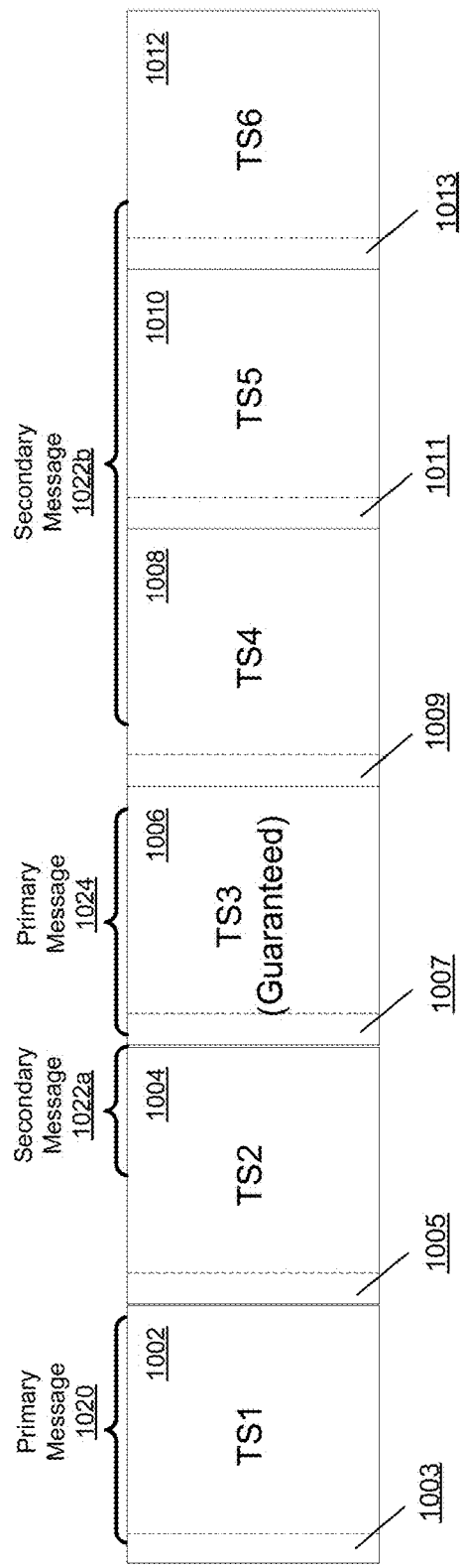
FIG. 10 is a diagram illustrating an alternate example of a sequence of timeslots and interleaved media access control features being implemented in the timeslots.

FIGS. 9 and 10 depict example timing diagrams of sequences of TSCH timeslots 600 and example scenarios for trigger conditions that result in the gateway device 104a switching from receiving communication from a HAN 100 to listening for communication from the data network 106. Specifically, FIG. 9 depicts switching from receiving a message on a secondary network back to listening for communication on a primary network based on the start of a new timeslot or an RX period of a new timeslot. In this example, the trigger condition can include receiving a complete message from the primary network and starting a new timeslot. FIG. 9 includes a sequence of TSCH timeslots 902, 904, 906, 908, 910, and 912. Each timeslot includes an RX wait period 903, 905, 907, 909, 911, 913, respectively, as the period during which the gateway device 104a listens for communication from the data network 106. In the example shown in FIG. 9, the data network receives no messages from the data network 106 that the gateway device 104a is required to process during the RX wait period 903 (the first portion of time for the first timeslot 903). In response, the gateway device 104a switches to listening for communication from the HAN 100 during the second portion of the first timeslot 902. As shown in FIG. 9, the gateway device 104a receives a message from the secondary network (shown as secondary message 920). The gateway device 104a finishes receiving the message at a time during the second timeslot 904. Given that transmission of the secondary message 920 from the HAN 100 is complete, the gateway device 904 remains idle until the start of the third timeslot 906.

The start of an RX period of the third timeslot 906, in this example, corresponds to the trigger condition indicating that the gateway device 104a switch to listening for a message from the primary network (e.g., the data network 106). As shown in the example, the gateway device 104a may receive a message from the primary network (shown as primary message 922) during the RX wait period 907. The gateway device 104a receives the complete message during a portion of the fourth timeslot 908. At the beginning of the fifth timeslot 910, the process repeats, resulting in the gateway device 104a listening for a message from the primary network. In the example, the gateway device 104a receives no message from the primary network during the RX wait period 911, and thus switches to listening for a secondary message from the secondary network (e.g., the HAN 100). The gateway device 104a may receive a second secondary message 924 during the fifth timeslot 910 and the duration of the sixth timeslot 912.

The messages from the primary network and the secondary network can vary in length, as shown by secondary receive messages 920, 924 and the primary message 922. Thus, even though each timeslot will contain a new RX wait period (during which the gateway device 104a can switch back to listening for messages from the data network 106), the gateway device 104a may continue receiving the message from the HAN 100 until the complete secondary message is received, as shown in FIG. 9. However, receipt of the message from the HAN 100 may be interrupted due to the start of a guaranteed timeslot.

FIG. 10 depicts a timing diagram where the gateway device 104a switches from receiving a message on a secondary network to listening for messages on a primary network based on the trigger condition of the start of a guaranteed timeslot. FIG. 10 depicts a sequence of timeslots 1001, 1004, 1006, 1008, 1010, and 1112, each of which include RX wait periods 1003, 1005, 1007, 1009, 1011, and 1013, respectively. In this example, the third timeslot 1006 is a guaranteed timeslot. FIG. 9 further illustrates that the gateway device 104a receives a primary message 1020 at the first RX wait period 1003 during the first timeslot 1002 (e.g., a message from the data network 106). The gateway device 104a completes receipt of the primary message 1020 near the end of the first timeslot 1002. During the second RX wait period 1005 (at the start of the second timeslot 1004), the gateway device 104a does not receive any message from the data network 106. Thus, as described above, the gateway device 104a switches to listen for messages from the secondary network (e.g., the HAN 100). In this example, the gateway device 104a detects a secondary message 1022a from the HAN 100 during a portion of the second timeslot 1004. In response, the gateway device 104a receives the secondary message 1022a from the secondary network. However, the secondary message 1022a may not be completely received. In this example, the third timeslot 1006 is a guaranteed timeslot. The start of the guaranteed timeslot causes the gateway device 104a to interrupt receipt of the secondary message 1022a to listen for communication from the primary network. Entering the RX wait period of 1007 of the third timeslot 1006 (the guaranteed timeslot), the gateway device 104a may or may not receive a primary message 1024. If the gateway device 104a receives the primary message 1024, and if the gateway device 104a completes receipt of the primary message 1024, the process repeats at the fourth timeslot 1008. During the RX wait period 1009 (the RX wait period for the fourth timeslot 1008), the gateway device 104a listens for additional communication from the primary network. In this example, no additional communication is received, resulting in the gateway device 104a switching to listen for messages from the secondary network. The gateway device 104a receives message 1022b during the second portion of the timeslot 1008. The message 1022b is received for a remaining duration of the timeslot 1008, through the timeslot 1010, and through a portion of the timeslot 1012. Since communication of the secondary message 1022a was interrupted due to the guaranteed timeslot, the secondary message 1022b may be a repeat communication of secondary message 1022a from the secondary network.

Figure 11:
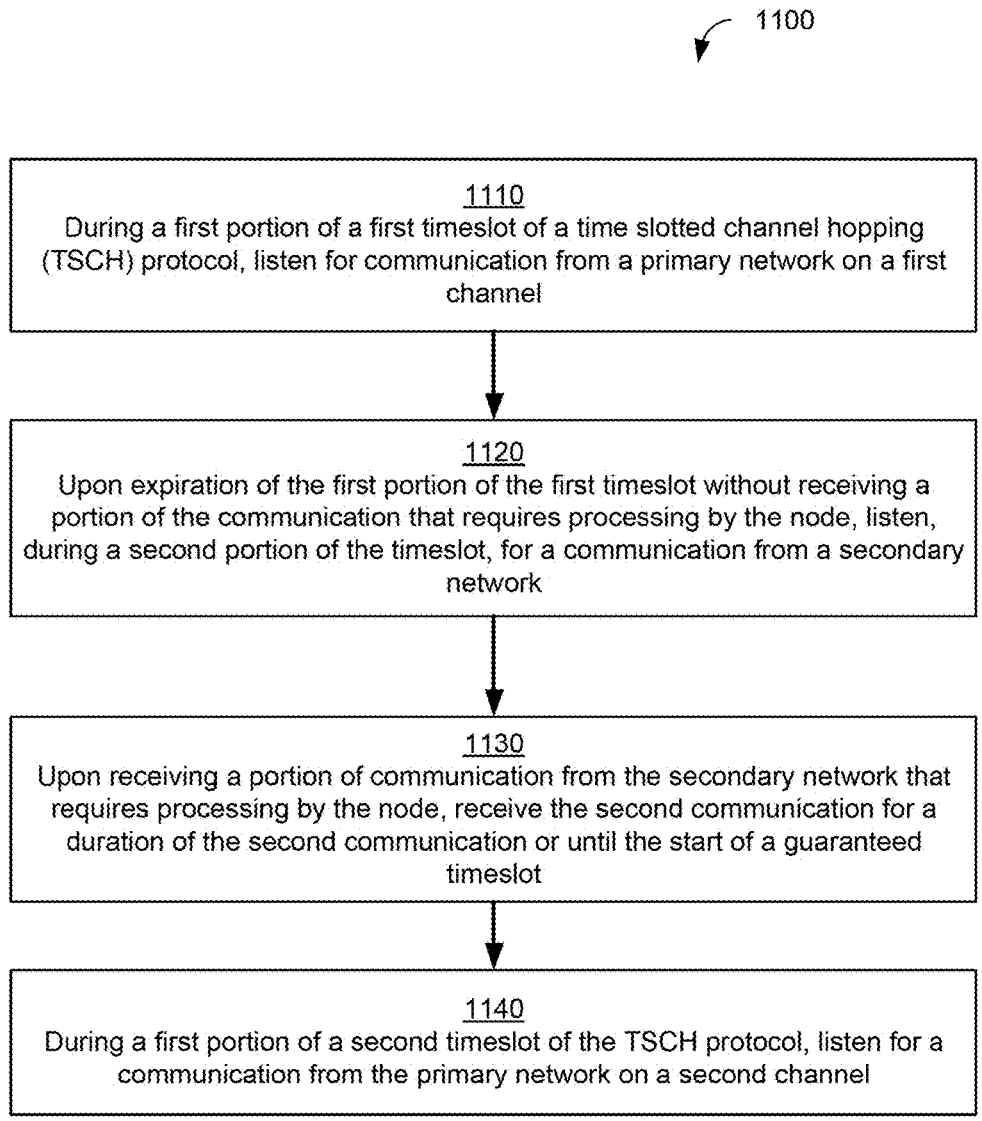
FIG. 11 is a flowchart depicting an alternate process for implementing interleaved media access control features.

FIG. 11 is an alternate flowchart illustrating another aspect for a method 1100 for communicating data from a HAN 100 within unused portions of TSCH timeslots used for communication with a data network 106. For illustrative purposes, the method 1100 is described with reference to the system implementations depicted in FIGS. 1-2 and with regards to the TSCH timeslot illustrations shown in FIGS. 6-7. Other implementations, however, are possible.

The method 1100 involves listening, during a first portion of a first timeslot of a TSCH protocol, for communication from a primary network on a first channel of the TSCH protocol, as shown in block 1110. For example, a gateway device 104a can listen for communication from other nodes in the data network 106 during an RX wait period 604, 704. A communication from the primary network can include one or more messages from the data network 106 that the gateway device 104a is required to process. For example, a gateway device 104a may be required to process communication broadcast from the data network 106 and communication addressed specifically to the gateway device 104a.

The method 1100 further involves listening, upon expiration of the first timeslot without receiving a portion of the communication that requires processing by the node, for a communication from a secondary network during a second portion of the timeslot, as shown in block 1120. For example, the secondary network may include the HAN 100 operating on a CSMA protocol. After expiration of the RX wait period 604, 704, the gateway device 104a may switch to listening for communication from the HAN 100 during the receive period 606, 706.

Upon receiving a portion of the communication from the secondary network that requires processing by the node, the node can receive the remainder of the second communication for a duration of the second communication or until the start of a guaranteed timeslot, as shown in block 1130. For example, as discussed above with respect to FIG. 9, the gateway device 104a can continue receiving the secondary message 920 until the secondary message 920 is completely received. Alternatively, as discussed above with respect to FIG. 10, the receipt of the secondary message 1022a from HAN 100 can be interrupted at the start of a subsequent time slot, for example in the case of a guaranteed timeslot 1006.

During the first portion of a subsequent timeslot of the TSCH protocol, the node may switch to listening for a communication from the primary network on a second channel, as shown in block 1140. For example, once the secondary message 920 is completely received by the gateway device 104a, or once receipt of the secondary message 1022a is interrupted due to the start of guaranteed timeslot 1006, the gateway device 104a can return to listening for communications from the data network 106 during the next RX wait period. Because the gateway device 104a operates using a TSCH protocol, the frequencies of the first channel and the second channel may be different.

In some aspects, the gateway device 104 may continue to listen for communication from the data network 106 that the gateway device 104 is required to process even after expiration of the first portion of the timeslot (e.g., after expiration of RX wait periods 604, 704). For example, nodes (gateway device 104a-d) in the data network 106 may operate on battery power. To improve battery efficiency and decrease overall power consumption, the nodes in the data network 106 may be configured to communicate a series of messages within multiple TSCH timeslots. The series of timeslots during which nodes, which may be battery powered, communicate may be predefined during initial configuration of the data network 106. The duration of the series of timeslots may be referred to as a battery powered window. In this aspect, upon the start of a battery powered window, the gateway device 104a may listen for messages the gateway device 104a is required to process for multiple timeslots defining the battery powered window. Upon expiration of the battery powered window, the gateway device 104a may return to switching listening periods between the first network and the second network as discussed above with regards to FIGS. 8-10.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A gateway device comprising:
a single transceiver device configured to communicate with a primary network using a time slotted channel hopping protocol and with a secondary network using a CSMA protocol, wherein the single transceiver device includes a first MAC layer for communicating using the time slotted channel hopping protocol, and a second MAC layer for communicating using the CSMA protocol;
the gateway device operable to:
at a beginning of a first timeslot of the time slotted channel hopping protocol, listening on the primary network using the first MAC layer and a first channel, wherein the first channel is based on a hopping pattern for the time slotted channel hopping protocol;
when no message from the primary network is received by the first MAC layer during a receive time period of the first timeslot, then listening on the secondary network using the second MAC layer during a portion of the first timeslot following the receive time period;

when the second MAC layer is receiving a message from the secondary network, continuing to receive the message from the secondary network during a remainder of the first timeslot following the receive time period; and at a beginning of a second timeslot subsequent to the first timeslot of the time slotted channel hopping protocol, listening on the primary network using the first MAC layer and a second channel, wherein the second channel is based on the hopping pattern for the time slotted channel hopping protocol.

2. The gateway device of claim 1, wherein receipt of the message from the secondary network is completed during the first timeslot, and wherein the second timeslot is temporally adjacent to the first timeslot.

3. The gateway device of claim 1, wherein the second MAC layer continues receiving the message from the secondary network beyond the first timeslot, and wherein at least one timeslot occurs between the first timeslot and the second timeslot.

4. The gateway device of claim 1, wherein in response to a trigger condition, the gateway device interrupts receipt of the message from the secondary network to listen on the primary network at the beginning of the second timeslot.

5. The gateway device of claim 4, wherein the trigger condition includes the second timeslot being a guaranteed time slot.

6. The gateway device of claim 1, wherein listening on the secondary network using the second MAC layer includes using a frequency other than a frequency corresponding to the first channel.

7. The gateway device of claim 1, wherein the gateway device further includes a metering device that measures energy consumption and transmits energy consumption information to a central system via the first MAC layer.

8. A method comprising:
at a beginning of a first timeslot of a time slotted channel hopping protocol, listening on a primary network using a first MAC layer and a first channel, wherein the first MAC layer supports the time slotted channel hopping protocol and the first channel is based on a hopping pattern for the time slotted channel hopping protocol;
when the first MAC layer is not receiving a message from the primary network during a receive time period of the first timeslot, then listening on a secondary network using a second MAC layer during a portion of the first timeslot following the receive time period, wherein the second MAC layer supports a wireless protocol that does not use the time slotted channel hopping protocol;
when the second MAC layer is receiving a message from the secondary network during the portion of the first timeslot following the receive time period, continuing to receive the message from the secondary network for a remainder of the first timeslot; and
at a beginning of a second timeslot subsequent to the first timeslot of the time slotted channel hopping protocol, listening on the primary network using the first MAC layer and a second channel, wherein the second channel is based on the hopping pattern for the time slotted channel hopping protocol.

9. The method of claim 8, wherein the first timeslot includes the receive time period and a settle period following the receive time period, and the portion of the first timeslot following the receive time period follows the settle period.

10. The method of claim 9, wherein listening on the secondary network using the second MAC layer includes using a frequency other than a frequency corresponding to the first channel.

11. The method of claim 8, further comprising:
when the first MAC layer is receiving a message from the primary network during the receive time period of the first timeslot, then continuing to receive the message using the first MAC layer during the portion of the first timeslot following the receive time period.

12. The method of claim 8, wherein receipt of the message from the secondary network is completed during the first timeslot, and wherein the second timeslot is temporally adjacent to the first timeslot.

13. The method of claim 8, wherein the second MAC layer continues receiving the message from the secondary network beyond the first timeslot, and wherein at least one timeslot occurs between the first timeslot and the second timeslot.

14. The method of claim 8, wherein in response to a trigger condition, interrupting receipt of the message from the secondary network to listen on the primary network at the beginning of the second timeslot.

15. The method of claim 14, wherein the trigger condition includes the second timeslot being a guaranteed time slot.

16. A gateway device, comprising:
a protocol stack that includes a single PHY layer, a first MAC layer for communicating using a time slotted channel hopping protocol and a second MAC layer for communicating using a CSMA protocol, a single IP layer, and a single transport layer;
the gateway device operable to:
listening on a primary network using the first MAC layer and a first channel for at least a receive time period of a first timeslot, wherein the first channel is based on a hopping pattern for the time slotted channel hopping protocol;
when the receive time period expires without the first MAC layer receiving a message from the primary network, then listening on a secondary network using the second MAC layer during a portion of the first timeslot following the receive time period;
when the second MAC layer is receiving a message from the secondary network, continuing to receive the message from the secondary network during a remainder of the first timeslot following the receive time period; and
at a beginning of a second timeslot subsequent to the first timeslot of the time slotted channel hopping protocol, listening on the primary network using the first MAC layer and a second channel, wherein the second channel is based on the hopping pattern for the time slotted channel hopping protocol.

17. The gateway device of claim 16, wherein receipt of the message from the secondary network is completed during the first timeslot, and wherein the second timeslot is temporally adjacent to the first timeslot.

18. The gateway device of claim 16, wherein the second MAC layer continues receiving the message from the secondary network beyond the first timeslot, and wherein at least one timeslot occurs between the first timeslot and the second timeslot.

19. The gateway device of claim 16, wherein in response to a trigger condition, the gateway device interrupts receipt of the message from the secondary network to listen on the primary network at the beginning of the second timeslot.

20. The gateway device of claim 19, wherein the trigger condition includes the second timeslot being a guaranteed time slot.

21. The gateway device of claim 16, wherein listening on the secondary network using the second MAC layer includes using a frequency other than a frequency corresponding to the first channel.

* * * * *